June 15, 1954  E. LE R. TURNER  2,681,144
ICE CREAM PACKAGE
Filed Aug. 31, 1950  2 Sheets-Sheet 1
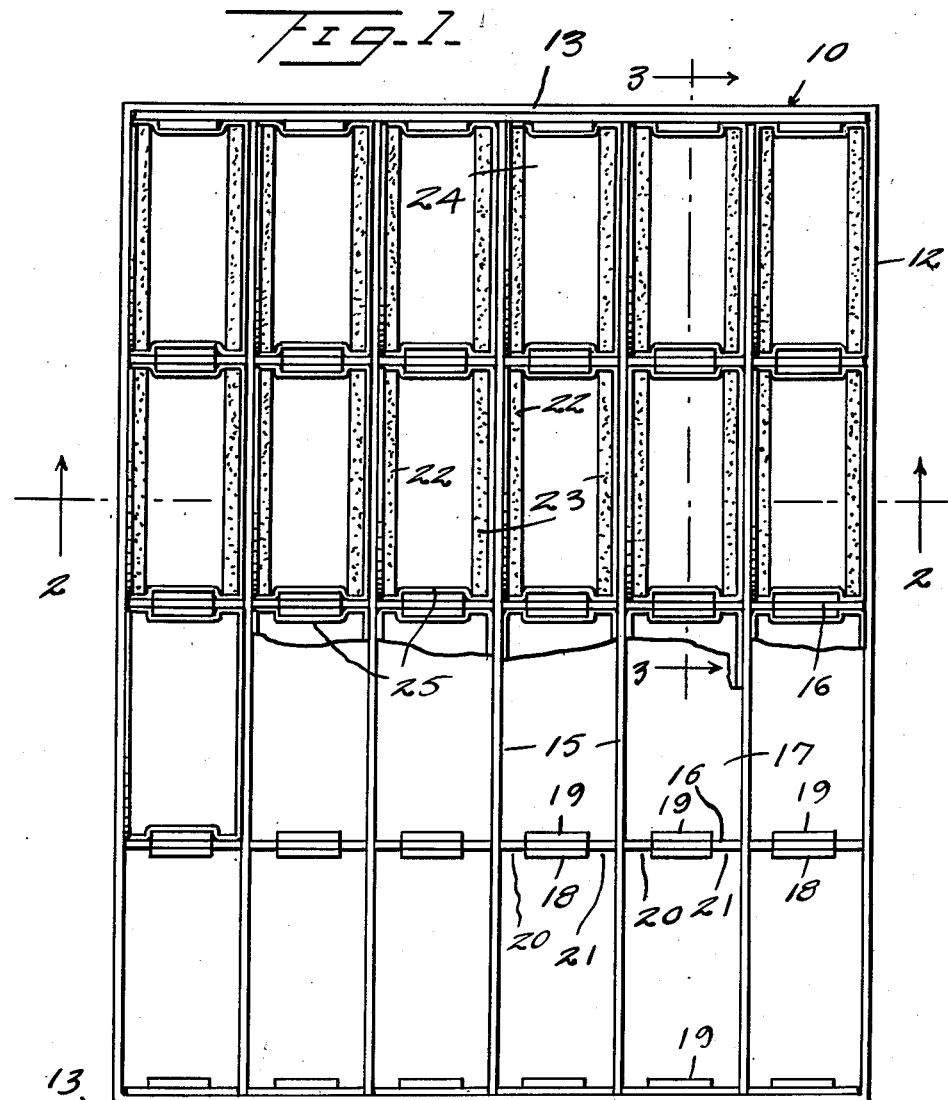
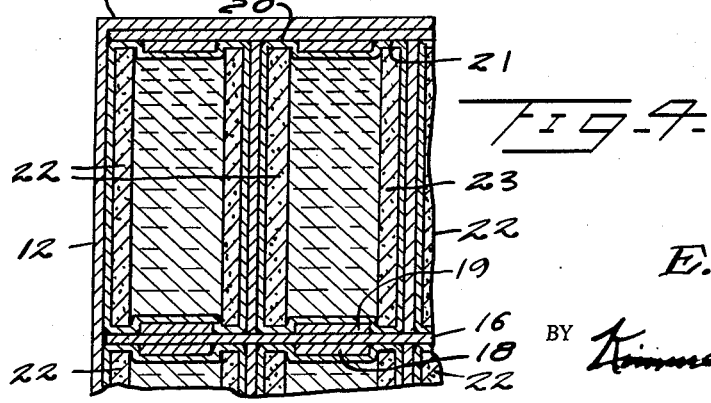
INVENTOR
E. L. Turner
BY Kimmel & Crowell
ATTORNEYS June 15, 1954  E. LE R. TURNER  2,681,144
ICE CREAM PACKAGE
Filed Aug. 31, 1950  2 Sheets-Sheet 2
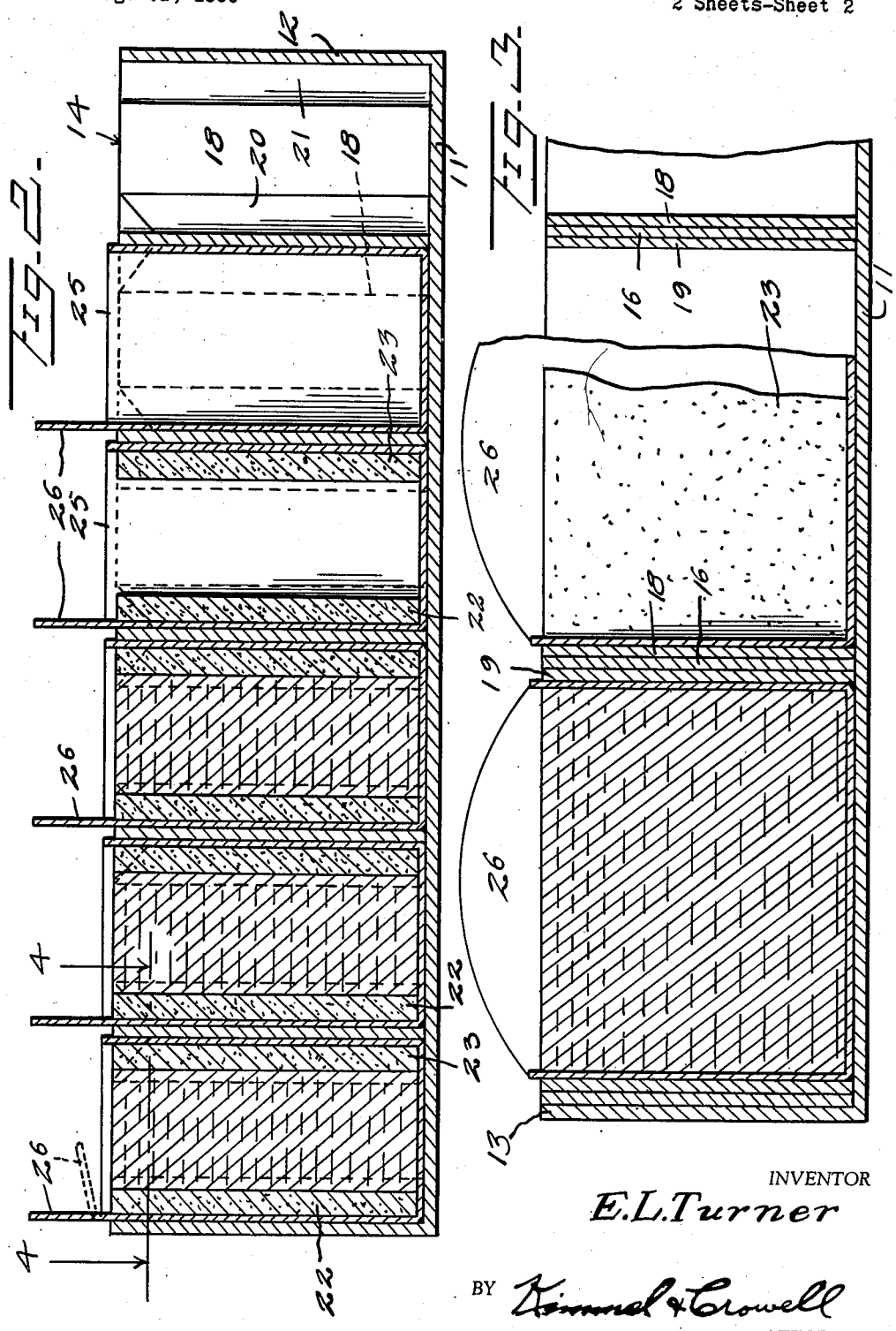
INVENTOR
*E. L. Turner*
BY *Kimmel & Crowell*
ATTORNEYS Patented June 15, 1954

2,681,144

UNITED STATES PATENT OFFICE 2,681,144

ICE CREAM PACKAGE

Estie Le Roy Turner, Atlanta, Ga., assignor, by mesne assignments, to Robert E. Beckwith, Worthington, Ohio Application August 31, 1950, Serial No. 182,559

1 Claim. (Cl. 206—72)

This invention relates to an ice cream package.

An object of this invention is to provide a receptacle for ice cream sandwiches which will securely hold the sandwiches so that they can be removed without injury.

Another object of this invention is to provide an improved package which is so constructed as to hold the cookies in upright spaced position before the ice cream is inserted therebetween so that the cookies will not be broken at the time the ice cream is inserted.

A further object of this invention is to provide an improved divider or partition assembly which can be collapsed when removed from the container.

With the above and other objects in view, my invention consists in the arrangement, combination and details of construction disclosed in the drawings and specification, and then more particularly pointed out in the appended claim.

In the drawings:

Figure 1 is a plan view of an ice cream sandwich package constructed according to an embodiment of this invention.

Figure 2 is a sectional view taken on the line 2—2 of Figure 1.

Figure 3 is a fragmentary sectional view taken on the line 3—3 of Figure 1.

Figure 4 is a fragmentary sectional view taken on the line 4—4 of Figure 2.

Referring to the drawings the numeral 10 designates generally a container which is formed of a bottom wall 11, opposite side walls 12, and opposite end walls 13. The container or holder 10 is rectangular in configuration and may be formed out of cardboard or the like which may be made moisture proof. The container 10 has removably mounted therein a divider or partition assembly generally designated as 14. The partition assembly 14 comprises a plurality of spaced apart parallel longitudinal partition members 15 and a plurality of spaced apart parallel transverse partition members 16.

The partition members 15 and 16 divide the interior of the container or holder 10 into a plurality of rectangular compartments or chambers 17. Each partition member 16 has disposed on the opposite sides thereof plates 18 and 19 which are the width less than the width of the chambers 17 so as to thereby form a pair of grooves 20 and 21 at each end of a chamber 17.

The grooves 20 and 21 provide a means for holding upright a pair of cookies 22 and 23 before the ice cream 24 is inserted therebetween. Before the cookies 22 and 23 are inserted into a chamber 17 a paper bag 25 is inserted into the chamber, and the bag is of rectangular configuration in horizontal section and is of such a size that when the cookies 22 and 23 are inserted within, the bag will be pressed outwardly and into the grooves 20 and 21. With the cookies 22 and 23 in spaced apart relation within a bag 25 the ice cream 24 may be inserted between the cookies. Each bag 25 is of a height substantially equal to or slightly greater than the depth of a chamber 17 as shown in Figure 2, and one side of the bag 25 is preferably formed with an upwardly projecting lip 26 which may be used for pulling a filled bag from a chamber 17.

The partition or divider assembly 14 is preferably formed out of cardboard or the like, and the crossed partitions 15 and 16 are interlocked together in a conventional manner so that a partition or divider assembly when removed from the container or holder 10 may be collapsed to a substantially flat form. With a holder or container as hereinbefore described a substantial number of ice cream sandwiches may be made up at one time and may be placed within the bags and compartments of the container so that the filled container may be placed within a refrigerator to maintain the ice cream 24 substantially hard.

When an ice cream sandwich is to be removed from the container the projecting lip 26 of one bag may be pulled upwardly so as to remove the ice cream sandwich within the bag from the holder. The provision of the confronting groove forming plates 18 and 19 at the opposite ends of each chamber provides a means whereby all of the chambers in a container may be initially filled with cookies which will engage in the confronting grooves of the chamber and the grooves provide a means for holding the cookies in spaced apart upright position before the ice cream is inserted therebetween.

What is claimed is:

An ice cream sandwich holder comprising a container formed of a bottom wall and upstanding sides and ends, and a partition member in said container, said member being formed of parallel longitudinally disposed partitions, parallel transversely disposed intermediate partitions intersecting and foldably interlocked with said longitudinal partitions and forming therewith a plurality of rectangular chambers, pairs of longitudinally aligned plates of a height equal to the height of said partitions, permanently fixed along their entire length to each intermediate transverse partition on opposite sides thereof in vertical position and in face-to-face relation on opposite sides of each chamber, said plates having a width less than the width of a chamber to thereby form a pair of vertically disposed rectangular grooves at each end of each intermediate chamber and end transverse members having plates aligned with the corresponding plates on opposed intermediate transverse partitions thereby to form a pair of vertically disposed grooves at the outer end of each end chamber.

References Cited in the file of this patent

UNITED STATES PATENTS

| Number | Name | Date |
|---|---|---|
| 549,783 | Guilbert | Nov. 12, 1895 |
| 933,599 | Teasdale | Sept. 7, 1909 |
| 943,719 | Vick | Dec. 21, 1909 |
| 1,126,274 | Reynolds | Jan. 26, 1915 |
| 1,880,897 | Drewsen | Oct. 4, 1932 |
| 1,995,482 | Plautz | Mar. 26, 1935 |
| 2,192,412 | Reaume | Mar. 5, 1940 |
| 2,517,756 | Zabriskie, III et al. | Aug. 8, 1950 |
| 2,521,403 | Overland | Sept. 5, 1950 |
| 2,575,829 | Nixon | Nov. 20, 1951 |
| 2,591,812 | Henderson | Apr. 8, 1952 |

FOREIGN PATENTS

| Number | Country | Date |
|---|---|---|
| 381,057 | Great Britain | Sept. 29, 1932 |